United States Patent [19]

Renner

[11] 3,787,137

[45] Jan. 22, 1974

[54] ADJUSTABLE LOCK FOR A COLUMN MOUNTED TOOL

[75] Inventor: Earl G. Renner, St. Charles, Ill.

[73] Assignee: McGraw-Edison Company, Elgin, Ill.

[22] Filed: Nov. 21, 1972

[21] Appl. No.: 308,430

[52] U.S. Cl.............. 408/241 R, 29/1 A, 188/67, 408/236
[51] Int. Cl........................................ B23b 47/26
[58] Field of Search........ 408/235, 236, 712, 241 R; 29/1 A; 188/67

[56] References Cited
UNITED STATES PATENTS

| 516,173 | 3/1894 | Bjurlund | 188/67 X |
| 1,444,334 | 2/1923 | Cleveland | 408/236 |
| 2,762,243 | 9/1956 | Knosp et al. | 408/236 |

Primary Examiner—Francis S. Husar

[57] ABSTRACT

This invention has particular utility in the drill press art where it is desired to adjust and lock a column head, to which a power tool is connected, heightwise on its supporting column. The head has a bore that fits freely over the column, and a leaf spring is secured to the head in the bore and engages the column to impose a continuous drag between the head and column of magnitude greater than the weight of the head and tool so that the head will not slide under this weight along the column but instead will remain stationary until moved by the manually applied height adjusting force. A manually controlled lock is also carried in the head which can be engaged to permanently lock the head at the adjusted column position.

9 Claims, 4 Drawing Figures

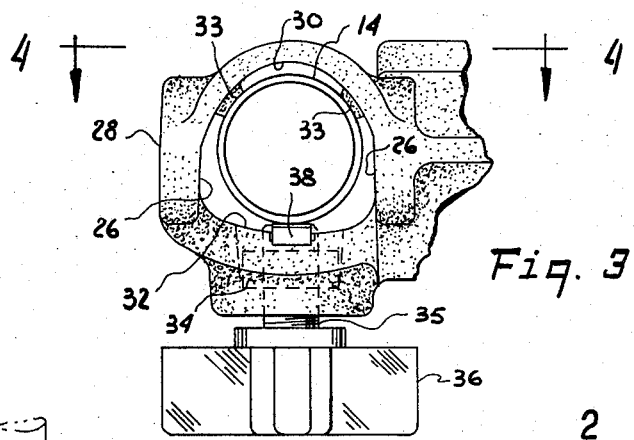
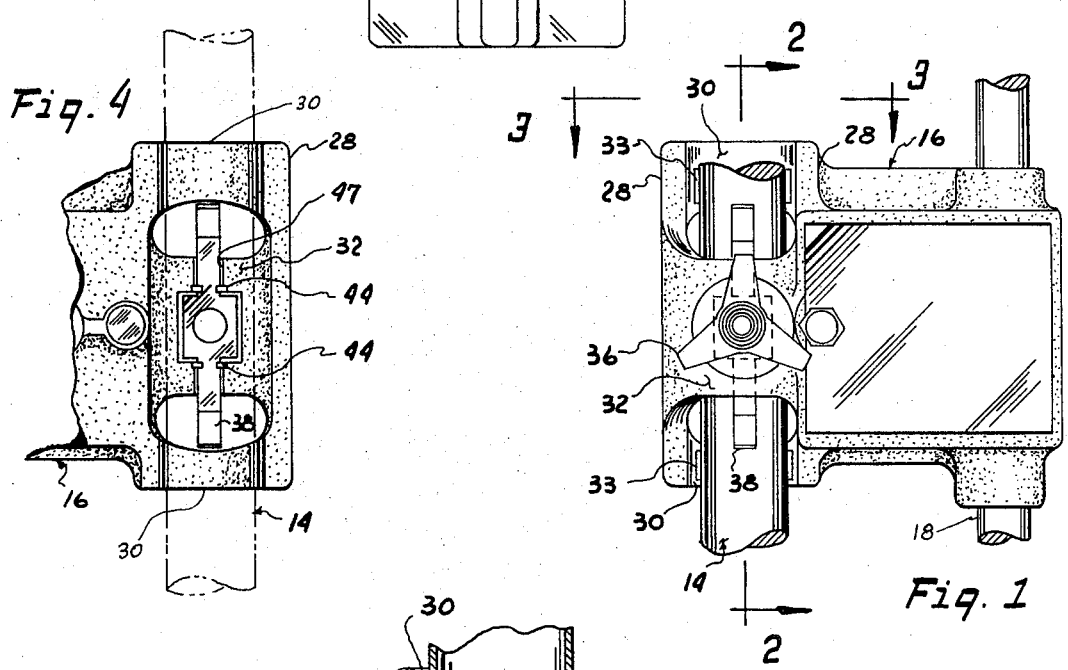
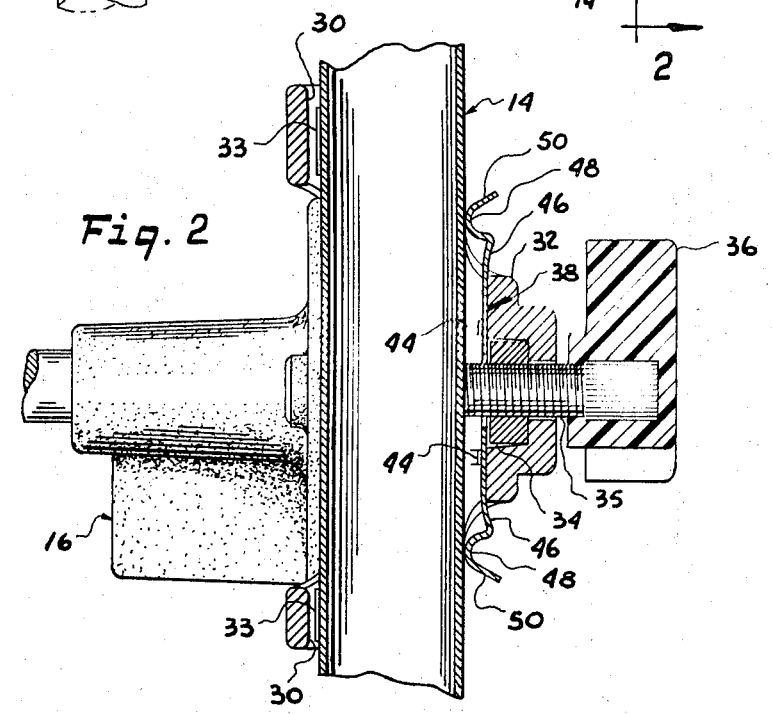

ADJUSTABLE LOCK FOR A COLUMN MOUNTED TOOL

This invention will be more fully appreciated after referring to the following specification, the accompanying drawing forming a part thereof: wherein FIG. 1 is a side elevational view of a column and column head supported thereon and showing an embodiment of the subject invention;

FIG. 2 is a sectional view as seen generally from line 2—2 in FIG. 1;

FIG. 3 is a top view as seen generally from line 3—3 in FIG. 1; and

FIG. 4 is an elevational view as seen generally from line 4—4 in FIG. 3.

Referring now to the drawing, there is shown a column 14 and a head 16 mounted to slide on the column for heightwise adjustment, and the head can then be locked in the desired heightwise position. The head can support, according to the application of Michael Lay co-filed herewith and entitled Variable Speed Drill Press, a power output assembly (only the movable rack shaft 18 being shown) which assembly might include a motor and an output shaft supported laterally adjacent the column and having a chuck for holding a cutting bit. The rack shaft 18 and thus the supported output assembly and the chuck can be moved axially of the column to achieve the cutting stroke of the power tool. Specific details of this arrangement are disclosed in the above referred to Lay application and forms no basis of this invention.

The particular column head 16 is formed as a casting, typically of aluminum for example, having a bore 26 sufficiently larger than the column to freely receive the same. The head bore 26 is defined by two axially extended opposed webs or ribs 28 connected at opposite ends across one side of the bore by curved cradle sections 30 and across the opposite side by a curved central bridging section 32.

Each cradle section 28 is curved at a radius equal to or slightly larger than the exterior radius of the column and has raised bosses 33 that project slightly into the bore at circumferential spaced locations approximately 75° to 125° apart. The bridging section 32 also has an inside face curved at a radius equal to or larger than the radius of the column and is disposed a distance further spaced from the middle of the bore than the radius of the column. This bore configuration provides that a column in the bore can engage the bore periphery only along the four narrow raised boss areas 33 when the column is held in this position.

The bridging section has a recess therein for receiving a nut 34 and a lock bolt 35 having a handle 36 thereon can be extended through a bore in the head and threaded into the nut. Upon lock bolt rotation, the bolt can be driven tightly against the column for drawing the contact areas 33 of the bridging cradle sections snuggly against the column for locking the head to the column.

The subject invention provides a spring 38 fitted on and secured to the head in the area adjacent the nut which provides a continuous force and thus friction drag between the head and the column of magnitude to prevent the head from sliding along the column even when the locking bolt 35 is loosened. In the disclosed embodiment, the spring is one piece having a central base received in the same recess that the tapping nut 34 is received and fits over the nut and is moreover effective to hold the nut and be held in place directly by staking over part of the casting such as at 44 onto the positioned spring. The spring has opposing leaf type cantilevered sections 46 which extend outwardly from the base within axial recesses 47 in the casing to just short of the end cradle sections. Each leaf has a projection 48 that extends into the bore and is then back folded on itself as along the flared terminus 50. The spring when positioned in the head casting has the projections or bend portions 48 closer to the opposed cradle sections than the adjacent column face so that the column cannot be fitted in the bore without flexure of the spring. The flared end portions 50 of the spring provide ample forward lead to accomodate the insertion of the column into the head or of the head over the top end of the column. The spring base has an opening to receive the locking bolt 35.

The spring is designed with sufficient resiliency and strength so that it engages the column and thereby imposes a sliding friction as between the spring bends 48 and head faces 33 and the column 14 to preclude shifting of the head relative to the column, particularly when the same is subjected to a force equal to or at most only slightly more than the weight of the head and the power tool carried thereby. This thereby allows for the heightwise positioning on the column of the head when the lock 35 is not set while yet having continuous control of the head by applying a manual force sufficient to overcome this drag, and if the adjustment is upward the weight of the head and power tool.

I claim

1. For use with an upstanding column, a head supported on and moved axially along the column, and a lock operable when set for holding the head as adjusted along the column, the combination comprising the head having a bore sized to receive for free sliding movement the column and receiving same, and a flat leaf spring carried by the head within the bore and having a cantilevered end that projects radially into the bore a distance sufficient to interfere with and against the column when the later is positioned in the bore and operable thereby to be flexed for urging head-column-spring engagement with a minimum force sufficient to establish a friction drag equal to or slightly in excess of the weight of the head effective thereby to prevent head sliding along the column except when manual operator forces are exerted axially between the column and head for the intentional manual adjustment of the head along the column.

2. The combination according to claim 1, wherein the leaf spring cantilevered end extends in a direction generally parallel to the column.

3. The combination according to claim 1, wherein the spring has a base portion held snug against the head and has opposed cantilevered ends that project from the base portion and that are flexed by the positioned column.

4. The combination according to claim 3, wherein the lock includes a nut carried in recess in the head, and wherein the base portion of the spring lies adjacent the nut to hold the nut in the recess, and means secures the spring to the head.

5. The combination according to claim 1, wherein the head includes opposed axial webs connected together by spaced curved cradle portions which define one side of the bore and an intermediate curved bridging portion that defines the opposite side of the base.

6. The combination according to claim 5, wherein the flat leaf spring is carried by the head at the bridging portion and the cantilevered end extends therefrom in a direction generally parallel to the positioned columns.

7. The combination according to claim 6, wherein the lock includes a nut carried in a recess in the head, and wherein the flat leaf spring is adjacent the nut and holds the nut in the recess, and wherein means secures the spring to the head.

8. The combination according to claim 6, wherein the curved cradle portions are shaped to have two spaced tangent areas of contacts on each against the positioned column and generally spaced apart approximately 75° to 125°.

9. The combination according to claim 8, wherein the lock includes a nut carried in a recess in the head, wherein the flat leaf spring is adjacent the nut and holds the nut in the recess, and wherein part of the head is stacked over the spring to hold same within the head.

* * * * *